(12) United States Patent
Zuardy et al.

(10) Patent No.: US 9,533,453 B2
(45) Date of Patent: Jan. 3, 2017

(54) SYSTEM FOR MONITORING FLOW OF A MATRIX MATERIAL IN A MOLDING TOOL USING A SCATTERING OPTICAL SIGNAL TRANSMITTED ALONG AT LEAST ONE OPTICAL FIBER DURING PRODUCTION OF A COMPONENT

(71) Applicant: Airbus Operations GmbH, Hamburg (DE)

(72) Inventors: Ichwan M. Zuardy, Hamburg (DE); Pierre C. Zahlen, Stade (DE); Clemens Bockenheimer, Bremen (DE); Oliver Bullinger, Stade (DE)

(73) Assignee: Airbus Operations GmbH, Hamburg (DE)

( * ) Notice: Subject to any disclaimer, the term of this patent is extended or adjusted under 35 U.S.C. 154(b) by 332 days.

(21) Appl. No.: 13/909,667

(22) Filed: Jun. 4, 2013

(65) Prior Publication Data

US 2013/0341497 A1    Dec. 26, 2013

Related U.S. Application Data

(60) Provisional application No. 61/655,507, filed on Jun. 5, 2012.

(30) Foreign Application Priority Data

Jun. 5, 2012  (EP) ..................................... 12170869

(51) Int. Cl.
  *G01J 1/04*  (2006.01)
  *G01N 21/85*  (2006.01)
  (Continued)

(52) U.S. Cl.
  CPC ......... *B29C 70/546* (2013.01); *G01D 5/35358* (2013.01); *G01L 1/242* (2013.01);
  (Continued)

(58) Field of Classification Search
  CPC .... G01M 5/0091; G01M 1/083; G01M 11/31; G01K 11/32; G01D 5/35358; G01D 5/353; G01D 5/35303; B29C 37/00; B29C 39/44; B29C 70/546; G01L 1/242
  (Continued)

(56) References Cited

U.S. PATENT DOCUMENTS 4,812,645 A  3/1989  Griffiths
4,936,649 A  6/1990  Lymer et al.
  (Continued)

FOREIGN PATENT DOCUMENTS

JP    2004101472    4/2004
WO   2011089244    7/2011

OTHER PUBLICATIONS

European Search Report, Oct. 17, 2012.
  (Continued)

*Primary Examiner* — Que T Le
*Assistant Examiner* — Jennifer Bennett
(74) *Attorney, Agent, or Firm* — Greer, Burns & Crain, Ltd.

(57) ABSTRACT

A system for monitoring a fiber-reinforced composite component in production or in service. The system includes a composite component having reinforcing fibers which are encompassed by a matrix material; at least one optical fiber arranged to extend in a continuous path over a monitoring area of the composite component for contact with the matrix material; a signal generator configured to transmit an optical signal along the at least one optical fiber; and a detector device configured to detect scattering, and in particular backscattering, of the optical signal transmitted along the at least one optical fiber.

16 Claims, 3 Drawing Sheets

(51) Int. Cl.
*B29C 70/54* (2006.01)
*G01D 5/353* (2006.01)
*G01L 1/24* (2006.01)
*G01M 5/00* (2006.01)
*G01K 11/32* (2006.01)
*G01M 11/08* (2006.01)

(52) U.S. Cl.
CPC .......... *G01M 5/0091* (2013.01); *G01K 11/32* (2013.01); *G01M 11/083* (2013.01)

(58) Field of Classification Search
USPC ............. 250/227.14, 216, 227.11, 227.15, 250/227.19, 573; 374/131, 120, 141; 138/104, 172; 156/64, 350, 359, 367, 378, 156/379, 356, 381; 385/13, 12; 356/73.1
See application file for complete search history.

(56) References Cited

U.S. PATENT DOCUMENTS

| | | | | |
|---|---|---|---|---|
| 4,947,693 | A * | 8/1990 | Szuchy et al. | 73/800 |
| 6,361,299 | B1 * | 3/2002 | Quigley et al. | 428/35.9 |
| 7,081,218 | B2 * | 7/2006 | Sekido et al. | 264/40.1 |
| 8,989,538 | B2 * | 3/2015 | Schade | G01D 5/35383 385/12 |
| 2009/0092173 | A1 | 4/2009 | Glombitza | |
| 2012/0217382 | A1 * | 8/2012 | Zuardy | B29C 31/04 250/227.11 |

OTHER PUBLICATIONS

European Patent Office, Office Action from Corresponding European Patent Application 14191848.2-1558, dated Feb. 20, 2015.

* cited by examiner

SYSTEM FOR MONITORING FLOW OF A MATRIX MATERIAL IN A MOLDING TOOL USING A SCATTERING OPTICAL SIGNAL TRANSMITTED ALONG AT LEAST ONE OPTICAL FIBER DURING PRODUCTION OF A COMPONENT

CROSS-REFERENCES TO RELATED APPLICATIONS

This application claims the benefit of the U.S. Provisional Application No. 61/655,507, filed on Jun. 5, 2012, and of the European patent application No. 12170869.7 filed on Jun. 5, 2012, the entire disclosures of which are incorporated herein by way of reference.

FIELD OF THE INVENTION

The present invention relates to a system and a method for monitoring an aircraft or spacecraft component in production and/or in service, especially a fiber-reinforced composite component, and particularly for quality assurance of the component. The invention further relates to a component, particularly a fiber-reinforced composite, of an aircraft or spacecraft that is suitable for use in such a system or method, especially as a structural or load-bearing member.

BACKGROUND OF THE INVENTION

Efforts are being made in aircraft construction to employ components on an increasing scale that consist completely or at least partly of fiber-reinforced composite materials, e.g., carbon-fiber-reinforced plastics (CFRP), as structural or load-bearing components. For example, DE 10 2007 062 111 A1 describes a transverse-member structure consisting of carbon-fiber-reinforced plastic, which serves to support individual panels of an aircraft floor system for separating a passenger cabin from a cargo compartment arranged below the passenger cabin. Furthermore, it is known from DE 10 2007 062 111 A1 to employ components fabricated in a sandwich construction (i.e., with a core and outer (e.g., top and bottom) layers consisting of a fiber-reinforced plastic material applied to the core) as floor panels or ceiling panels in an aircraft.

For the purpose of producing components from fiber-reinforced composite materials, the reinforcing fibers are usually first introduced into a molding tool. Subsequently, the fibers are impregnated with the matrix material (e.g., polymer) which is typically provided in liquid form. Finally, curing of the matrix material is effected by appropriate control of temperature and/or pressure. Known methods for producing components from fiber-reinforced composite materials include injection methods, wherein the liquid matrix material is injected into a closed molding tool under elevated pressure of over 6 bar. Furthermore, infusion methods are known, wherein the reinforcing fibers are inserted into an open molding tool and are normally covered with a semipermeable membrane that is pervious to gases but impervious to the matrix material. The semipermeable membrane is covered by a gas-impervious film, so that an under-pressure can be applied between the semipermeable membrane and the gas-impervious film and, as a result, liquid matrix material can be drawn or sucked into the molding tool.

Irrespective of whether an injection method or an infusion method is employed for producing a component from a fiber-reinforced composite material, the control of the flow of matrix material into and through the molding tool is of crucial importance for the quality of the component. Thus, in the case of production of the component by an infusion method with an open molding tool, the flow of the matrix material is ordinarily monitored by means of a CCD camera. In the case of production of the component by an injection method with a closed molding tool, on the other hand, visual monitoring of the flow of matrix material is not possible, so sensors such as, for example ultrasonic sensors, line sensors that operate capacitively, temperature sensors and/or pressure sensors are employed. Generally, however, these sensor-based measuring systems do not provide continuous data on the actual advance of the front of matrix material in real time as the sensors only detect changes in the corresponding physical quantities at discrete locations.

SUMMARY OF THE INVENTION

Thus, the present invention is directed towards specifying a system and a method for monitoring a composite component in production and/or in service; e.g., a system and method that enable an easy and reliable monitoring of a flow of material into and through a molding tool in fabrication or production of the composite component, and/or that enable an easy and reliable monitoring of structural integrity of the component during service. Furthermore, the invention is directed towards making available a component for an aircraft or spacecraft, especially a fiber-reinforced composite component, which is suitable for use in the above system and method, e.g., as a load-bearing member.

According to one aspect, therefore, the invention provides a system for monitoring a composite component of an aircraft or spacecraft in production and/or in service, comprising:

a composite component having reinforcing fibers which are encompassed by a matrix material, the fibers preferably being provided in one or more layer and/or in an array;

at least one optical fiber arranged to extend in a continuous path over a monitoring area of the component for at least partial contact with the matrix material;

a signal generator configured to generate and transmit an optical signal along the at least one optical fiber; and a detector device configured to detect scattering, and especially backscattering, of the optical signal transmitted along the at least one optical fiber.

In a preferred embodiment, the detector device is configured to detect Rayleigh scattering, Raman scattering, or Brillouin scattering the optical signal transmitted along the optical fiber, or a combination thereof. In this regard, the system effectively comprises one or more distributed optical fiber sensors. The system is naturally configured to analyse or to evaluate the scattering detected by the detector device. To this end, the system—and preferably the detector device itself—may comprise an evaluating unit having a processor, e.g., a computer processor, and a spectrometer for detecting and analysing wavelengths of the backscattered light. A distinctive property of distributed optical fiber sensors is the ability to spatially resolve the detected and measured scattering along the entire length of the optical fiber. Two important areas of interest in this regard are distributed temperature and strain measurements. In this way, the system of the invention is effectively able to provide continuous monitoring of the composite component, e.g., during its production or fabrication and/or during its service-life. The flow of matrix material in the production or fabrication of a fiber-reinforced composite component could hitherto only be monitored at discrete locations or measurement points with conventional sensor techniques.

The system of the present invention therefore takes advantage of the fact that light propagating through an optical fiber attenuates gradually due to the said scattering. By virtue of the fact that the detector device in the inventive system is configured to detect the backscattering from the signal, the detection and/or evaluation of that backscattering may be carried out at just one end of the optical fiber, so that the technique is convenient to employ. Further, the at least one optical fiber used in the system of the invention can be a standard electronics-grade glass fiber or even a structural-grade glass fiber and does not require a grating, as required in fiber Bragg grating (FBG) systems.

Because the back-scattered light attenuates exponentially as it travels along an optical fiber, the attenuation can be represented on a logarithmic scale graph. If the slope of the graph is steep, the power loss is generally high and this is typically characteristic of a disturbance or change in one or more physical parameter in and around the optical fiber, e.g., temperature and strain. If the slope is gentle, the optical fiber may have a "normal" loss characteristic, indicating no disturbance or change in physical parameters. When light waves are guided or transmitted in an optical fiber, back-scattered light waves with the same kinetic energy but having a different frequency (i.e., typically less) than the incident light are observed. This phenomenon is known as 'inelastic' scattering, and Raman and Brillouin scattering are examples. Whereas Raman scattering has been demonstrated to be suitable for determining temperature via the optical fibers, Brillouin scattering has been demonstrated to be useful for temperature as well as strain measurements. In Brillouin scattering, the backscattered light waves have a frequency of about 11 GHz, which is less than the incident light. The actual frequency (i.e., the "Brillouin frequency") of the backscattered light waves will depend on the load or temperature applied to the fiber. By comparing occurrences of these backscattered light waves from an affected part of the component, information can thus be derived on the location and magnitude of the load or temperature. This principle forms the basis for a Brillouin-based distributed optical fiber sensor system, such as via Brillouin Optical Correlation Domain Analysis (BOCDA).

In a preferred embodiment, the signal generator may comprise an optical emitter device, desirably in the form of a laser such as a fiber laser, a solid-state laser or a semiconductor laser, although other types of lasers are also contemplated by this invention. The laser may be configured to generate a pulsed optical signal. The signal generator is typically connected in optical communication with the at least one optical fiber along which the signal is transmitted.

In a particularly preferred embodiment, the system includes a plurality of separate optical fibers arranged to extend in a continuous path over a respective monitoring area (or the same monitoring area) of the composite component for contact with the matrix material. Thus, each optical fiber may form a separate path or circuit through the monitoring area of the composite component and the signal generator may be configured to generate and transmit an optical signal along each of the optical fibers. Preferably, each optical fiber is arranged to extend in a serpentine or meandering path over the monitoring area either adjacent to an outer surface of the composite component and/or encompassed within the matrix material of the composite component. The monitoring area of the composite component over which each optical fiber extends preferably corresponds to and/or is substantially parallel to an outer surface (i.e., a two-dimensional or three-dimensional surface) of the composite component. Alternatively, however, the monitoring area can extend transversely through the component and correspond to a cross-section or thickness thereof.

In a preferred embodiment, the at least one optical fiber is arranged in a filling region of a molding tool to be filled with the matrix material in a liquid form during production of the composite component. Thus, the detector device may be configured to detect a parameter that is characteristic of flow of the matrix material through the filling region during production of the composite component. In a highly preferred embodiment, therefore, the system further comprises a control unit which is adapted to control the flow of matrix material into and/or through the filling region of the molding tool (e.g., automatically) in dependence on the parameter detected by the detector device and/or output by the evaluating unit.

In a preferred embodiment, the composite component has a sandwich construction and includes a core that is received in the molding tool. In this embodiment, therefore, the filling region of the molding tool may extend along a surface of the core. The at least one optical fiber may be separated from the filling region by a separating device, such as a sheet or a film, which may limit physical contact between the optical fiber and the matrix material but nevertheless allows thermal contact. Alternatively, the at least one optical fiber may be arranged directly in the filling region to be encompassed by the matrix material.

According to a particularly preferred aspect, therefore, the invention provides a system for monitoring a fiber-reinforced composite component in production or fabrication, comprising:

a molding tool defining a filling region for forming a composite component therein and including reinforcing fibers provided in the filling region to be filled with a matrix material in liquid form;

at least one optical fiber arranged to extend in a continuous, desirably serpentine, path over a monitoring area of the composite component to be formed in the molding tool such that the optical fiber is arranged for contact with the matrix material filled into the filling region;

a signal generator configured to generate and transmit an optical signal along the at least one optical fiber; and a detector device configured to detect scattering, and especially backscattering, of the optical signal transmitted along the at least one optical fiber.

In this context, the system of the invention may therefore also be understood as a system for fabricating or producing a fiber-reinforced composite component.

In a preferred embodiment, the system of the invention for monitoring production of the composite component may include a storage tank for receiving the liquid matrix material. For example, the liquid matrix material received in the storage tank may be a curable resin, in particular an epoxy resin or an epoxy-amine resin. For example, the material storage tank may be filled with an RTM6 resin manufactured by Hexcel. Furthermore, a material supply line is present which connects the material storage tank to the filling region of the molding tool.

In a preferred embodiment, a single or uninterrupted filling region to be filled with matrix material from the storage tank may be formed in the molding tool. Alternatively, however, the molding tool may include a plurality of separate filling regions to be filled with matrix material from the storage tank. In such a configuration, a plurality of material supply lines is preferably present to connect the individual filling regions of the molding tool to the material storage tank. Furthermore, a single filling region may, of course, also be connected to the storage tank via several material supply lines if, for example, it is desired to fill the filling region with the liquid matrix material quickly, via a number of inlets or from multiple directions. In this regard, it will be understood that the molding tool typically comprises a mold or form in which a shape of the composite component is at least partly cast or determined.

In the course of fabricating a component with the system of the invention, the liquid matrix material is conveyed out of the tank and through the material supply line(s) into the filling region, preferably until the filling region of the molding tool has been completely filled with the matrix material. For the purpose of conveying the material out of the storage tank and into the molding tool, a suitable conveying device, for example a pump, may be present. The pump may be provided to subject the liquid material in the material storage tank to an elevated pressure; for example, up to or over 6 bar. Alternatively, however, the conveying device may be adapted to generate an under-pressure in the filling region of the molding tool and thereby to suck material out of the material storage tank into the filling region of the molding tool.

The system of the invention could conceivably be employed for the purpose of producing a component consisting merely of matrix material from the storage tank, but this system is preferably employed in the fabrication of a component that comprises, at least partially, a fiber-reinforced composite material. Production of a component that comprises a fiber-reinforced composite material with the system of the present invention may be undertaken by an injection method or by an infusion method. Furthermore, depending on demand, use may be made of either an open or a closed molding tool. Irrespective of the configuration of the conveying device and of the molding tool, however, the movement of a front of the liquid matrix material through the material supply line and subsequently through the filling region formed in the molding tool always occurs.

Prior to the supply of the liquid matrix material from the storage tank, a reinforcing fiber material is arranged in the filling region of the molding tool. The reinforcing fibers can be arranged in the molding tool as individual fibers designed as short fibers or continuous fibers, as a fibrous wad, or in the form of a two-dimensional or three-dimensional fabric. The introduction of reinforcing fibers into the filling region of the molding tool, however, does not alter the fact that, during supply of the liquid matrix material from the storage tank into the filling region of the molding tool, a front of the matrix material moves through the material supply line and subsequently through the filling region of the molding tool. Indeed, the front of the matrix material flows over and around the reinforcing fibers of the component as it proceeds through the filling region of the molding tool thereby to encompass the fibers.

The flow of matrix material out of the tank and through the material supply line and the filling region of the molding tool constitutes an important process parameter in the course of producing a component with the system of the invention. The rate of motion of a flow front of the matrix material out of the material storage tank and through the material supply line and/or through the filling region of the molding tool depends, inter alia, on the temperature and the (temperature-dependent) viscosity of the material and on the conveying capacity of a conveying device for conveying the material out of the material storage tank through the material supply line and/or through the filling region of the molding tool.

Therefore, the system includes the at least one optical fiber arranged in the region of the material supply line and/or in the filling region of the molding tool, as well as the signal generator and detector device described to above.

A deformation of the optical fiber in the longitudinal direction of the fiber, which may be caused by a mechanical elongation or compression of the fiber, but also by a change in temperature in the environment of the fiber, results in an alteration of the backscattering from the optical signal transmitted along the optical fiber. The distributed sensors provide for very accurate detection of a deformation of the optical fiber in the longitudinal direction of the fiber. If a mechanical deformation of the optical fiber is excluded, that is, if the deformation of the fiber is exclusively temperature-induced and consequently capable of being described by the coefficient of thermal expansion of the fiber, the evaluation of the backscattering consequently immediately enables conclusions as regards the changes of temperature in the environment of the optical fiber.

The parameter detected by the detector device, which is characteristic of the flow of material through the material supply line and/or the filling region of the molding tool, may be evaluated by means of a suitable evaluating unit and, if desired, monitored manually. For example, the evaluating unit may include a spectrometer for detecting the wavelength of the backscattered light. From the wavelength of the backscattered light, the evaluating unit can then determine the change of temperature to be detected or measured in the environment of the optical fiber.

The detector device can consequently be used in the system of the invention for monitoring a component for the purpose of detecting deformations of the optical fiber in the longitudinal direction of the fiber that are caused by changes of temperature in the environment of the optical fiber. These changes of temperature are, in turn, caused by the flow of the material out of the storage tank through the material supply line and/or through the filling region of the molding tool. In this way, the detector device detects a deformation of the optical fiber in the longitudinal direction of the fiber, which is caused by a change of temperature in the environment of the optical fiber as a parameter characteristic of the flow of material through the material supply line and/or through the filling region of the molding tool.

The detector device employed in the system of the invention is capable of detecting even small changes of temperature in the environment of the optical fiber very accurately. A particularly high measurement accuracy, however, is obtained when the matrix material in the storage tank has a temperature differing from that of the molding tool. For example, the material in the storage tank may be heated to a temperature of about 80° C., whereas the material supply line and/or the molding tool is/are preferably heated to a temperature of about 120° C. It will be understood that the movement of a front of the material out of the material storage tank through the material supply line and/or through the filling region of the molding tool then has the consequence of an immediate change of temperature in the environment of the optical fiber arranged in the region of the material supply line and/or the filling region of the molding tool. Indeed, a change of temperature in a vicinity of the flow front can be detected due to the resin, e.g., due to polymerization of the resin, even before the flow front has actually reached the optical fiber. By means of the backscattering, detection of the progress of the front of the matrix material through the material supply line and/or through the filling region of the molding tool can consequently be detected in real time. The range of temperature that is capable of being detected in this way lies between −200° C. and 200° C.; the measurement accuracy may be ΔT<0.5 K and the reproducibility of the measurements may be around 0.1 K.

As noted above, the system preferably comprises an electronic control unit and may be adapted to automatically control the flow of liquid matrix material through the material supply line and/or through the filling region of the molding tool in dependence on the signals output by the evaluating unit. For example, the control unit may be configured to receive signals output by the evaluating unit and to control a heating device for heating the matrix material in the storage tank and/or a heating device for heating the molding tool and/or a conveying device for conveying the matrix material out of the storage tank and through the material supply line and/or the filling region of the molding tool based on the scattering detected by the detector device or the evaluated parameters.

By appropriately controlling a heating device for heating the material storage tank and/or a heating device for heating the molding tool, the viscosity of the material flowing through the material supply line and/or the filling region of the molding tool and consequently the rate of flow of the material through the material supply line and/or the filling region of the molding tool can be influenced. In similar manner, by appropriately controlling a conveying device the flow-rate of the material through the material supply line and/or the filling region of the molding tool can be influenced. The control unit consequently makes it possible to react immediately to measurements obtained by the detector device. For example, the control unit can compare measured values provided by the detector device with corresponding set values, and on the basis of a measured-value/set-value comparison of such a type can bring influence to bear on the flow of material though the material supply line and/or the filling region of the molding tool.

The at least one optical fiber arranged in the filling region of the molding tool may be at least partially separated from the liquid matrix material by a separating device, such as a membrane or a film. If the optical fiber is separated from the matrix material in the filling region by a membrane or film, this avoids the optical fiber being contaminated by the liquid matrix material introduced into the filling region of the molding tool and the optical fiber(s) can then be easily and conveniently re-used. Alternatively, however, the optical fiber/s may be arranged in the filling region of the molding tool to be encompassed by and embedded in the matrix material in the course of the supply of material from the storage tank into the molding tool. This configuration provides highly accurate detection and/or measurement by the detector device and, due to the small physical size of the optical fibers, the flow of matrix material through the filling region is not significantly influenced or impaired.

It will be appreciated that after the composite component has been formed in the molding tool and the matrix material has been cured, the system of the invention can be further used to monitor the cooling of the newly fabricated component. In particular, because curing of the component typically takes place at elevated temperatures (e.g., in the range of 120° C. to 200° C.), the distributed optical fiber sensor system of the invention can be used to monitor stresses and strains in the component as it cools to ensure that the composite component is not subject to potentially damaging stresses or strains due to an irregular, uneven or overly fast cooling procedure.

According to an alternative particularly preferred aspect, the invention provides a system for monitoring a component in service, comprising:

a composite component having reinforcing fibers within a matrix material, the composite component being incorporated in the structure of an aircraft or spacecraft, especially in the form of structural member;

at least one optical fiber arranged to extend in a continuous path over a monitoring area of the composite component within the matrix material;

a signal generator configured to generate and transmit optical signals along the at least one optical fiber, wherein the optical signals may be control signals to one or more operational units of the aircraft or spacecraft; and a detector device configured to detect scattering, and especially backscattering, of the optical signals transmitted along the at least one optical fiber, thereby to detect or to measure a parameter that is characteristic of the structural integrity of the composite component.

In this way, the system of the present invention which can be employed to monitor the production of the fiber-reinforced composite component can also be employed when the composite component is in service. More particularly, the at least one optical fiber which extends continuously over a monitoring area of the component can be used to transmit optical control signals to one or more operational units of the aircraft or spacecraft, while the backscattering from those same signals can be used to detect any change in the structural integrity of the component.

According to a further aspect, the invention provides a method of monitoring a component of an aircraft or spacecraft in production and/or in service, comprising the steps of:

providing a composite component with reinforcing fibers which are encompassed by a matrix material, the reinforcing fibers preferably being provided in one or more layer and/or in an array;

arranging at least one optical fiber to extend in a continuous path over a monitoring area of the composite component for contact with the matrix material;

transmitting an optical signal along the at least one optical fiber; and detecting scattering, and in particular backscattering, of the optical signal transmitted along the at least one optical fiber.

In a preferred embodiment, the step of detecting scattering or backscattering of the optical signal comprises detecting any one or more of Rayleigh scattering, Raman scattering, and Brillouin scattering of the optical signal transmitted along the optical fiber. The method further comprises the step of: analysing or evaluating the scattering detected.

In a preferred embodiment of the method, the arranging step comprises arranging the at least one optical fiber to extend in a serpentine path over the monitoring area either adjacent to an outer surface of the composite component or encompassed within the matrix material of the composite component. The method preferably further comprises the step of: connecting the at least one optical fiber for optical communication with the signal generator.

In a preferred embodiment of the method, the arranging step comprises arranging the at least one optical fiber in a filling region of a molding tool to be filled with the matrix material in a liquid form during production of the composite component. Further, the detecting step comprises detecting a parameter that is characteristic of flow of the matrix material through the filling region during production of the composite component, and the method further comprises the step of: controlling the flow of the matrix material into and/or through the filling region of the molding tool in dependence upon the parameter detected. In this context, the method of the invention may therefore also be understood as a method of fabricating or producing a composite component.

As noted above, in an alternative preferred embodiment of the invention, the composite component may be incorporated in a hull structure of an aircraft or spacecraft, e.g., in the form of a structural member. In such an embodiment, the step of transmitting optical signals preferably includes transmitting control signals to one or more operational units of the aircraft or spacecraft along the at least one optical fiber, and the detecting step preferably includes detecting a parameter that is characteristic of the structural integrity of the composite component.

According to yet another aspect, the invention provides a fiber-reinforced composite component, especially for aircraft or spacecraft, comprising reinforcing fibers embedded within a polymer matrix material, and at least one optical fiber arranged to extend in a continuous path over a monitoring area of the composite component within the matrix material, wherein end regions of the at least one optical fiber extend from a periphery of the fiber-reinforced composite component, particularly from a periphery of the matrix material, and are configured for connection to a signal generator device for transmitting an optical signal along said optical fiber.

According to still a further aspect, the present invention provides an aircraft or a spacecraft comprising a system for monitoring a fiber-reinforced composite component in service according to the invention as described above with respect to any one of the preceding embodiments.

In a preferred embodiment the aircraft or spacecraft includes a plurality of composite components and/or a plurality of the optical fibers in each composite component, and the signal generator is configured to transmit an optical control signal to each operating unit as multiple separate parallel signals via the plurality of optical fibers and/or the plurality of composite components to generate redundancy in the control signal transmission.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION OF THE PREFERRED EMBODIMENTS

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a less abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study, except where specific meanings have otherwise been set forth herein.

Figure 1:
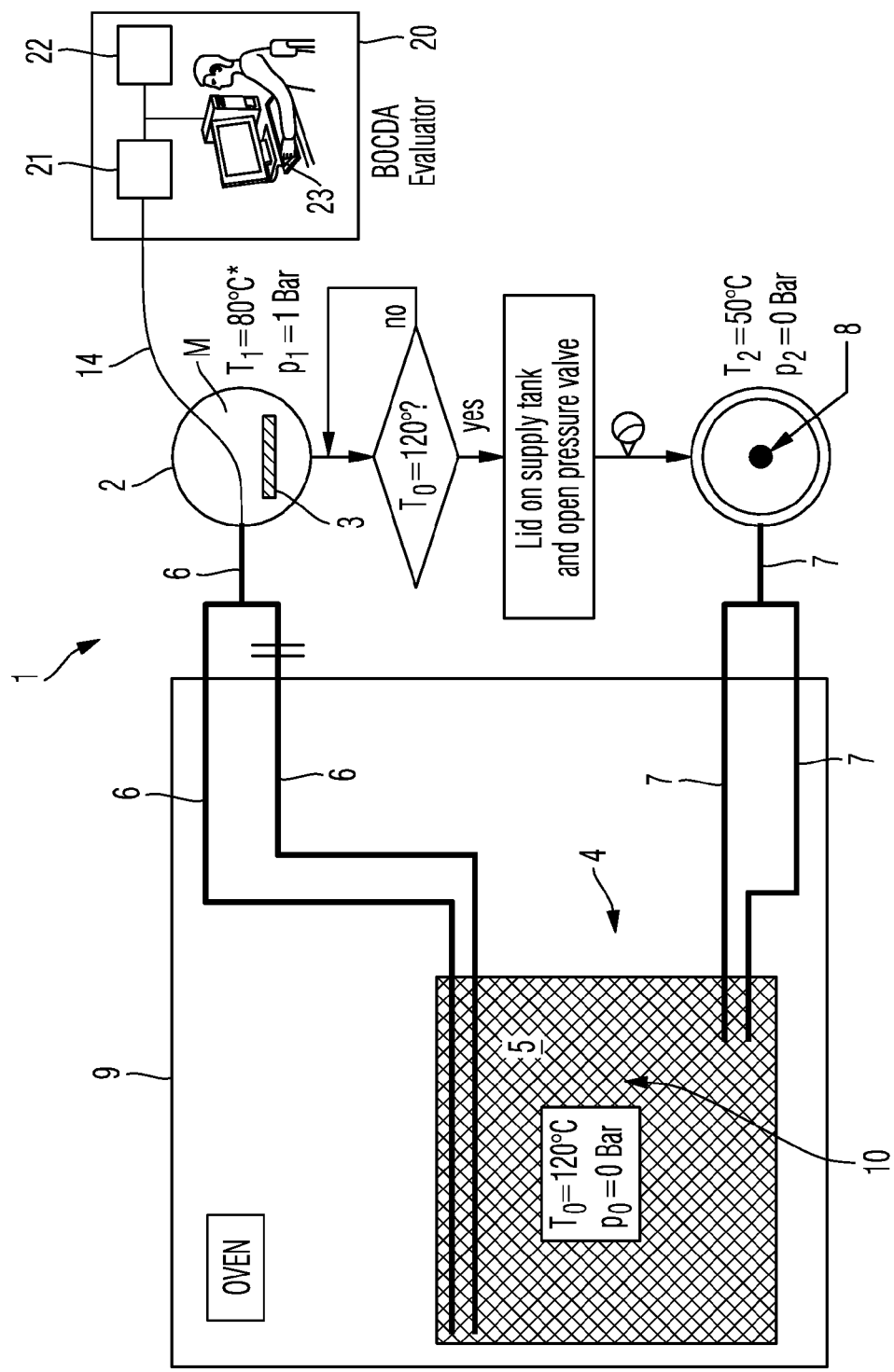
FIG. 1 is a schematic diagram of a system for monitoring a fiber-reinforced composite component in production according to an embodiment of the invention.

With reference firstly to FIG. 1 of the drawings, a system 1 for monitoring a composite component 10 during its production or fabrication according to a particular preferred embodiment of the invention is illustrated schematically. An example of the composite component 10 according to the present invention is shown schematically, but with some detail, in FIG. 2 and FIG. 3a of the drawings, and will be discussed further below.

In the embodiment described here, the composite component 10 is provided as a structural member for an aircraft and is formed in a sandwich construction as a panel component with a core 11 of foam material and upper and lower layers 12, 13 of a fiber-reinforced polymer. Further, reinforcing elements (not shown) that are themselves formed from fiber-reinforced composites (e.g., prepregs) may be integrated in the core 11 of the component 10. In this example, the panel component 10 will typically have a thickness in the range of 1 to 10 mm, and more preferably in the range of 2 to 5 mm. It should be noted that, while the system 1 of the invention can also be employed in the production of a component constructed merely in one phase and comprising only curable plastic material, its use in the fabrication of a fiber-reinforced composite is particularly preferred.

Referring to FIG. 1, the system 1 includes a storage tank 2 in which a liquid matrix material M is held. For example, the storage tank 2 may be filled with a curable resin such as, for example, an epoxy resin or an epoxy-amine resin. The matrix material M in the storage tank 2 is in the liquid state. By means of a first heating device 3, the storage tank 2 or the matrix material M in the tank 2 can be heated to a desired temperature. In the case of the matrix material M being an epoxy resin or epoxy-amine resin, the tank 2 is desirably heated via the first heating device 3 to a temperature of about 80° C.

The system 1 includes a molding tool 4 having a region for receiving the core 11 of the composite component 10 and a filling region 5 in which reinforcing fibers (not shown) are arranged, e.g., in the form of a fiber array (e.g., provided as a non-woven matting or in an arbitrary array) or in the form of one or more layers of a fiber fabric, on the upper and lower sides of the core 11. Preferably, the reinforcing fibers are carbon fibers and the core 11 may, for example, comprise a closed-cell polymethacrylimide foam.

Figure 3A:
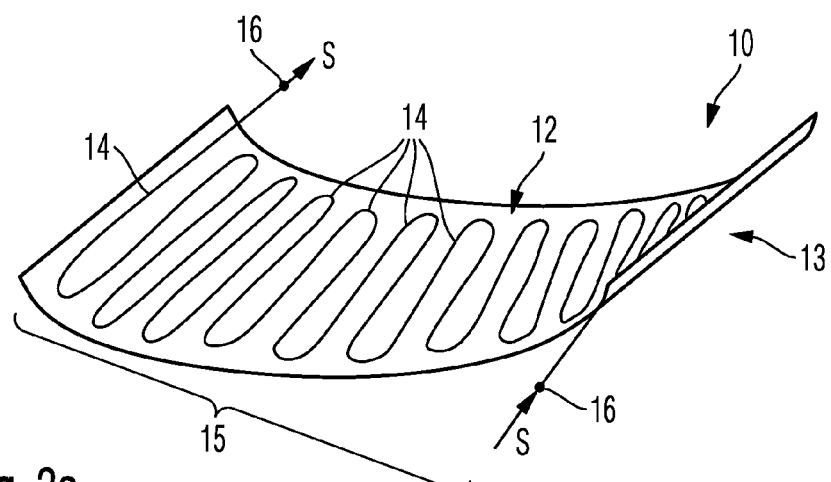
FIG. 3a is a schematic perspective illustration of a fiber-reinforced composite panel component according to an embodiment of the invention.

The filling region 5 formed in the molding tool 4 includes two sections which extend in a substantially planar manner along two opposing sides of the core 11. By supplying matrix material M from the storage tank 2 into filling region 5, the upper and lower layers 12, 13 of the component 10 covering the core 11 of the panel component 10 can be generated from a fiber-reinforced composite material; e.g., as a carbon-fiber-reinforced plastic material. Before this occurs, however, the system 1 and method of the invention involve the arrangement of at least one optical fiber 14 over a monitoring area 15 of the panel 10. In this embodiment, the monitoring area 15 essentially corresponds to an outer surface of the panel 10. As seen in FIG. 3a, the optical fiber 14 traces a continuous serpentine or meandering path over the monitoring area 15 and end regions 16 of the optical fiber 14 extend from a periphery of the panel component 10 for the input and output of an optical signal S, to be described shortly.

Figure 3B:
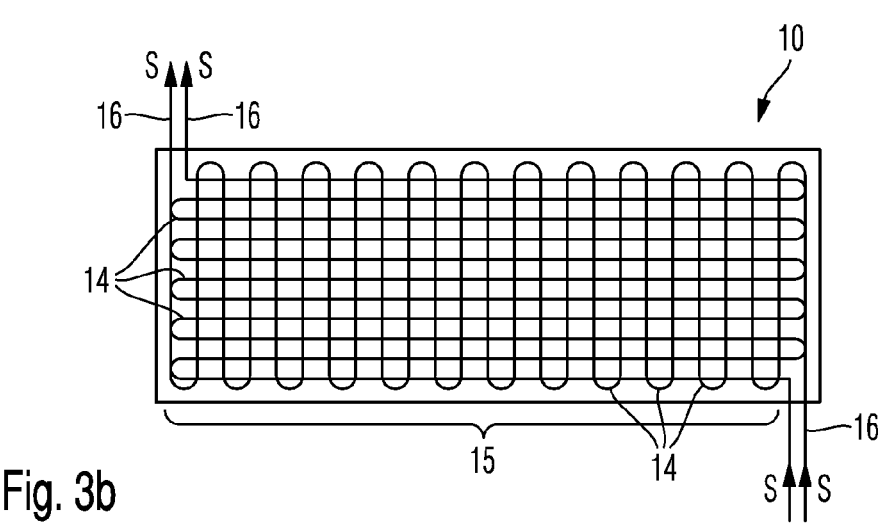
FIG. 3b is a top view of a fiber-reinforced composite panel component according to an alternative embodiment of the invention.

While FIG. 3a of the drawings shows a single optical fiber 14 on the upper side 12 of the panel component 10, it will be appreciated that another optical fiber 14 in a corresponding configuration may also be present on the lower side 13 of the panel. Furthermore, it will be appreciated that each of the upper and lower sides 12, 13 of the panel 10 may include more than one optical fiber 14 tracing a continuous path over the monitoring area 15, as shown in the alternative embodiment of FIG. 3b. In that embodiment, two optical fibers 14 extend in serpentine paths generally perpendicular to each other over the monitoring area 15. Such an arrangement of double optical fibers 14 is desirably provided on each of the upper and lower sides 12, 13 of the panel 10. This configuration provides the system 1 of the invention with a greater sensor density over the monitoring area 15, which in turn provides a higher degree of resolution or accuracy in the detections or measurements made with the system 1, as described below.

In producing the panel component 10, each optical fiber 14 is arranged in the desired configuration in the filling region 5 of the molding tool 4 together with the reinforcing fibers. Indeed, the optical fiber(s) 14 may be fixed or attached to the reinforcing fibers to ensure they remain in the desired path over the intended monitoring area 15 as the filling region 5 is filled with liquid matrix material M from the tank 2 and the composite component 10 is cast in the molding tool 4.

The filling region 5 of the molding tool 4 is connected to the storage tank 2 via one or more matrix material supply lines 6. Further, the filling region 5 of the molding tool 4 is also connected via a line 7 to a conveying device 8 which is designed in the form of a vacuum pump. In the embodiment of the system 1 shown in FIG. 1, the conveying device 8 serves to generate an under-pressure in the filling region 5 of molding tool 4, thereby to convey matrix material M out of the storage tank 2 into the filling region 5 of the molding tool 4. With this configuration, the tank 2 is not subjected to elevated pressure. Alternatively, however, an arrangement is also conceivable in which, by virtue of the generation of an elevated pressure in the storage tank 2 (for example, up to 6 bar), the matrix material M may be conveyed out of the storage tank 2 into the material supply line 6 and into the filling region 5 of the molding tool 4.

The system 1 includes a second heating device 9 in the form of an oven surrounding the molding tool 4, which serves to heat the molding tool 4 to a desired operating temperature. In the course of producing the composite panel component 10 shown in FIGS. 2 and 3, the molding tool 4 may be heated to a temperature of about 120° C. for the supply of the matrix material M from the storage tank 2 into the filling region 5. When the filling region 5 of the molding tool 4 is entirely full of matrix material M from the tank 2, the second heating device 9 may also be utilised to heat the molding tool 4 to a curing temperature to effect curing of the matrix material. For example, a curing temperature of about 180° C. is possible.

In the system 1, the optical fiber(s) 14 incorporated in the filling region 5 of the molding tool 4 is/are arranged to extend from the molding tool through the resin supply line 6 for connection to an optical signal generating device 21 in the form of a laser. That is, the signal generating device 21 is connected in communication with the optical fiber(s) 14 in the resin supply line 6 and the filling region 5 of the molding tool 4 and is configured to generate and transmit an optical signal S in the form of laser light pulses along each optical fiber 14. Further, the system 1 includes a detector device 22 configured to detect backscattering, particularly Brillouin scattering, from the optical signals S transmitted along the optical fiber(s) 14. In this regard, the detector device 22 includes an evaluating unit 23 having a computer processor and/or a spectrometer for performing a Brillouin Optical Correlation Domain Analysis (BOCDA) evaluation of the backscattering detected. In this way, the detector device 22 can detect the wavelength of the backscattered light and can ascertain from the backscattered wavelengths any significant change of temperature in the environment along the length of the optical fiber(s) 14.

In operation, when a temperature T0 of the molding tool 4 in the oven 9 is at 120° C., the conveying device or vacuum pump 8 of system 1 generates a vacuum or under-pressure P0 of about 0 bar in the filling region 5 of the molding tool 4 such that the matrix material M in the tank 2 at a temperature Ti of about 80° C. and pressure P1 of about 1 bar is drawn out of the tank 2 and drawn along the supply line 6 into the filling region 5 of the molding tool, so that the reinforcing fibers arranged in the filling region 5 are impregnated with matrix material. Flow of the liquid matrix material M through the upper and lower sections of the filling region 5, i.e., the movement of a flow front of the material M through the supply lines 6 and the filling region 5, can then be monitored via the detector device 22. In particular, the optical fibers 14 cooperate with the laser signal generator 21 and the detector device 22 to enable a virtually continuous monitoring of the progress of the flow front of the material M in the supply line 6 and through the filling region 5 in the monitoring area of the component 10 as it is formed in molding tool 4.

The movement of a flow front of the matrix material M out of the storage tank 2 with a temperature Ti of 80° C. through the supply lines 6 and into the filling region 5 of the heated molding tool 4 (i.e., at temperature T0 of about 120° C.) can thus be detected and traced by the BOCDA detector device 22 of the inventive system 1. The relatively cooler flow front of the resin is registered by the position along the optical fibers 14 of a corresponding temperature drop or decreasing temperature gradient in the BOCDA detector device. As the optical fibers 14 have a small physical volume, the flow of matrix material M through the supply line 6 and through the filling region 5 of the molding tool 4 is not significantly affected, even when the optical fiber 14 are directly integrated into the filling region 6 of the molding tool 4.

The parameters evaluated by the evaluating unit 23 may be supplied to an electrical control unit. In dependence on the signals supplied to it by the detector device, the control unit may control operation of the first heating device 3 for heating the matrix material M in the tank 2, and/or operation of the second heating device 9 for heating the molding tool, as well as operation of the conveying device 8 for conveying the material M out of the storage tank 2 into the filling region 5 of the molding tool 4. In other words, the control unit is able to influence movement of the flow front of the matrix material M through the material supply line 6 and the filling region 5 of the molding tool 4 in dependence upon signals output by the detector device 22 and the evaluating unit 23. To this end, the control unit may, for example, compare the rate of movement of the flow front of the matrix material M with predetermined values saved in a memory of the control unit.

As the system 1 operates with high-resolution and effectively continuously, the system 1 is able to monitor the advancing flow front and the already saturated part of the filling region very precisely while also determining its temperature distribution very accurately. By using optical fibers having an etched outer surface, the scattering of the optical signals may then vary where the fibers contact the liquid matrix material regardless of any temperature differential, such that the flow front of the resin can be monitored even without a temperature difference in the production system. The various advantages of this system 1 of the invention include: (a) the optical fibers are thin and lightweight, such that their presence has negligible effect on the structural mass or performance. They can also be embedded in the transverse core reinforcement of a sandwich structure; (b) the BOCDA distributed optical fiber sensors are electromagnetically (EM) tolerable and corrosion resistant; (c) the temperature front actually advances ahead of the resin flow front, such that a real-time measurement of the flow front is possible; (d) the almost complete temperature detection of the fabrication component can be used to regulate the oven temperature under consideration of the reaction kinetics; (e) the optical fibers can be recovered after production of the composite component and re-used, i.e., through the use of a separating membrane or peel film; (f) the optical fibers can alternatively be arranged embedded in the matrix material of the composite component and used later for "structural health monitoring" of the component in service; and (g) in contrast to the fiber Bragg grating (FBG), no gratings are required in the optical fiber so that conventional optical glass fibers may be used and measurements are theoretically possible over the entire length of the optical fibers, whereby a continuous monitoring of the flow front can be achieved.

Figure 2:
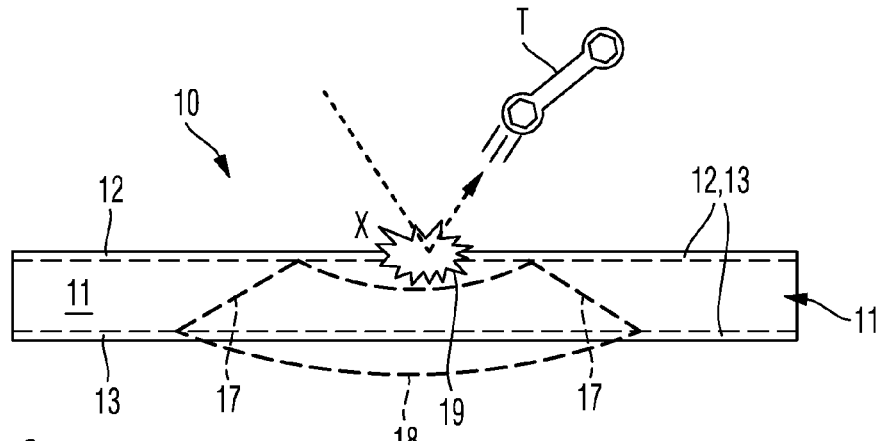
FIG. 2 is a schematic cross-sectional view of a "sandwich" type fiber-reinforced composite panel component in an aircraft with a system for monitoring the panel component in service according to an embodiment of the invention.

By arranging the optical fibers 14 integrated and embedded in the matrix material M of the composite component 10 during fabrication, those fibers 14 can also be used to monitor the structural integrity of the component 10 in service over the course of its service-life. In this regard, structural damage can occur during the service-life of the composite component 10 which is not necessarily able to be detected by a visual inspection. For example, differences in the temperature of the resin layers 12, 13 and the foam core 11 in service can lead to cracking (e.g., conical shear cracks 17) in the foam core 11 and, thus, to loss of structural integrity. Also, an unintended impact X to the panel component 10, for example by accidentally dropping a solid item, such as a tool T, as illustrated in FIG. 2, can cause undesired bending 18 in the CFRP outer layers 12, 13 of the component and may potentially lead to surface delamination 19. The present invention thus offers convenient temperature and strain monitoring via the embedded optical glass fibers 14 of the BOCDA system 1.

Figure 4:
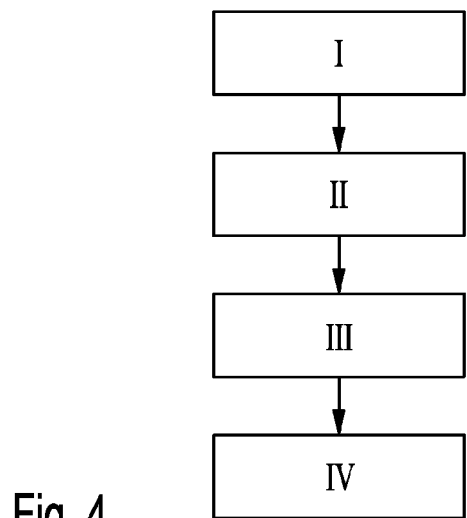
FIG. 4 is a flow diagram which schematically represents a method according to an embodiment of the invention.

In this embodiment, therefore, a BOCDA control unit 20 with a laser signal generating device 21 and a detector device 22 is incorporated in the aircraft. The detection and evaluation of variations in the wavelengths back-scattered to the detector device 22 from light signals transmitted by the laser source 21 over the monitoring area 15 enable conclusions regarding deformations in the optical fibers 14 in the longitudinal direction caused by a mechanical strain in the component 10. A complete cessation of signal transmission, on the other hand, would suggest a break in an optical fiber 14 and thus more substantial damage to the component 10. In an especially preferred embodiment of this invention, the optical fibers 14 of the component 10 are connected via their end regions 16 to operating units of the aircraft and the signals generated and transmitted by the signal generating device 21 are control signals for the operating units. Thus, the optical fibers 14 are used for transmission of optical control signals to the operating units (not shown) of the aircraft in service, while the BOCDA distributed sensors at the same time detect back-scattering from the control signals to monitor the structural integrity of the panels 10. As shown in FIG. 4, the composite panel components 10 may form sections of a hull or fuselage structure 28 of the aircraft. Such a fuselage structure 28 typically has three or four sections 29, e.g., formed as an upper crown shell section 29', a base shell section 29" and side shell sections 29'''. By transmitting control signals in parallel to the operating units of the aircraft via panel components 10 in each of the sections 29', 29", 29''', the control signals can be sent to the operating units with sufficient redundancy and all of the fuselage sections 29', 29", 29''' can be structurally monitored simultaneously.

Figure 5:
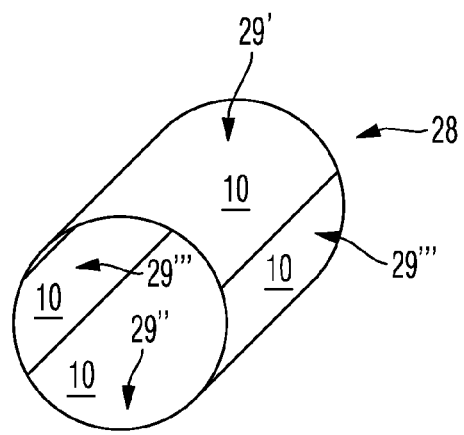
FIG. 5 is a schematic perspective view of an aircraft hull part according to an embodiment of the invention.

With reference now to FIG. 5 of the drawings, a method of monitoring a fiber-reinforced component 10 during production, or in service in an aircraft or spacecraft, according to the invention is illustrated schematically, with the individual numbered boxes I to IV of the diagram representing particular steps of the method. The first box I represents the step of providing a composite component comprising reinforcing fibers arranged in at least one layer and/or in an array which are encompassed by a matrix material, as described above. In the case of monitoring the composite component during production, this first step of providing the composite component involves fabricating the component using a molding tool. The second box II represents the step of arranging at least one optical fiber to extend in a continuous path over a monitoring area of the composite component in contact with the matrix material. In this context, regardless of whether the method is for monitoring the composite component during production or in service in an aircraft, this second step is performed during fabrication or production of the composite component and includes arranging the optical fiber in a filling region of a molding tool to be filled with the matrix material in a liquid form. The next box III represents a step of generating and transmitting an optical signal along the optical fiber. In the case of monitoring the composite component in service in an aircraft or spacecraft, the optical signals may include control signals transmitted to operational units of the air- or spacecraft along the optical fiber.

The fourth box IV represents the step of detecting scattering, in particular backscattering, of the optical signal transmitted along the optical fiber. In the case of monitoring the component during production, this fourth step involves detecting a parameter that is characteristic of flow of the matrix material through the filling region of the molding tool during production of the composite component. When monitoring the component in service, however, the fourth step rather involves detecting a parameter characteristic of the structural integrity of the component.

Figure 6:
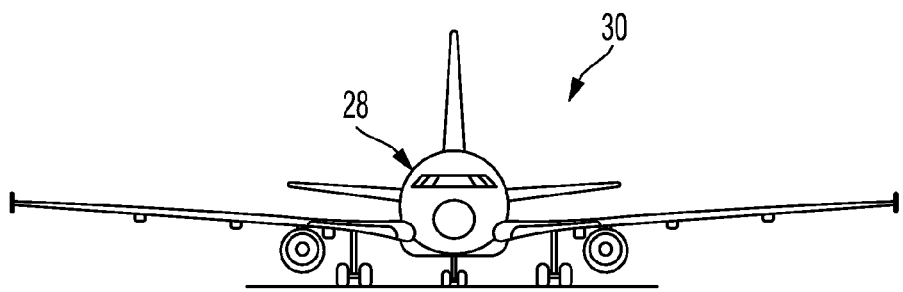
FIG. 6 shows an aircraft according to an embodiment of the invention.

Finally, an aircraft 30 is shown schematically in FIG. 6 with a fuselage structure 28 that incorporates one or more of the composite panel components 10 of the invention as described in detail above with reference to FIGS. 2 and 3.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "with", "comprise", "comprising", "include", "including", "contain", "containing", "have", "having", and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical or chronological requirements on, or to establish a ranking of importance of, their objects.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for monitoring a component in production and/or in service, comprising:
   a component comprising reinforcing fibers which are encompassed by a matrix material;
   at least one optical fiber arranged to extend in a continuous path over a monitoring area of the composite component for contact with the matrix material;
   a signal generator configured to transmit an optical signal along the at least one optical fiber; and
   a detector device configured to detect scattering of the optical signal transmitted along the at least one optical fiber,
   wherein the at least one optical fiber is arranged in a filling region of a molding tool to be filled with the matrix material in a liquid form during production of the composite component, and
   wherein the detector device is configured to detect a parameter that is characteristic of flow of the matrix material through the filling region during production of the composite component.

2. The system according to claim 1, wherein the scattering that the detector device is configured to detect is backscattering.

3. The system according to claim 1, wherein the detector device is configured to detect one or more of Rayleigh scattering, Raman scattering, and Brillouin scattering of the optical signal transmitted along the optical fiber, and wherein the system is configured to evaluate the scattering detected by the detector device.

4. The system according to claim 1, wherein the at least one optical fiber is arranged to extend in a serpentine or meandering path over the monitoring area one of adjacent to an outer surface of the composite component and encompassed within the matrix material of the composite component, and wherein the at least one optical fiber is connected for optical communication with the signal generator.

5. The system according to claim 1, wherein the monitoring area over which the at least one optical fiber extends at least one of:
   corresponds to an outer surface of the composite component;
   is substantially parallel to an outer surface of the composite component;
   corresponds to a thickness of the composite component; and
   is substantially parallel to a thickness of the composite component.

6. The system according to claim 1, further comprising a control unit which is adapted to control the flow of matrix material at least one of into and through the filling region of the molding tool in dependence upon the parameter detected by the detector device.

7. The system according to claim 1, wherein the at least one optical fiber arranged in the filling region of the molding tool is one of separated from the component by a separating device and arranged to be encompassed by the matrix material in the composite component.

8. The system according to claim 1, wherein the composite component is one of monolithic and a sandwich construction with a core that is received in the molding tool, the filling region of the molding tool extending along a surface of the core.

9. The system according to claim 1, wherein the composite component is incorporated in the structure of an aircraft or spacecraft, in the form of structural member, and wherein the signal generator is configured to transmit optical control signals to one or more operational units of the aircraft or spacecraft along the at least one optical fiber.

10. The system according to claim 9, wherein detector device is configured to detect a parameter characteristic of structural integrity of the composite component.

11. A method of monitoring a fiber-reinforced component in production and/or in service, comprising the steps of:
   providing a composite component having reinforcing fibers which are encompassed by a matrix material;
   arranging at least one optical fiber to extend in a continuous path over a monitoring area of the composite component for contact with the matrix material;

transmitting an optical signal along the at least one optical fiber; and detecting scattering of the optical signal transmitted along the at least one optical fiber;

wherein the arranging step comprises arranging the at least one optical fiber in a filling region of a molding tool to be filled with the matrix material in a liquid form during production of the composite component; and wherein the detecting step comprises detecting a parameter that is characteristic of flow of the matrix material through the filling region during production of the composite component.

12. The method according to claim 11, wherein the step of detecting scattering of the optical signal comprises detecting any one or more of Rayleigh scattering, Raman scattering, and Brillouin scattering of the optical signal transmitted along the optical fiber, wherein the method further comprises the step of:

analyzing or evaluating the scattering detected.

13. The method according to claim 11, wherein the arranging step comprises arranging the at least one optical fiber to extend in a meandering or serpentine path over the monitoring area, preferably adjacent to an outer surface of the composite component and/or encompassed within the matrix material; and wherein the method further comprises the step of connecting the at least one optical fiber for optical communication with a signal generator device.

14. The method according to claim 11, wherein the method further comprises the step of:

controlling flow of the matrix material at least one of into and through the filling region of the molding tool in dependence upon the parameter detected.

15. The method according to claim 11, wherein:

the composite component is incorporated in a hull structure of an aircraft or spacecraft, in the form of structural member;

the step of transmitting optical signals comprises transmitting optical control signals to one or more operational units of the aircraft or spacecraft along the at least one optical fiber; and the detecting step comprises detecting a parameter which is characteristic of structural integrity of the composite component.

16. An aircraft or a spacecraft comprising a system for monitoring a component in service according to claim 1.

* * * * *